United States Patent
Baladhandapani et al.

(10) Patent No.: US 12,151,826 B2
(45) Date of Patent: Nov. 26, 2024

(54) METHODS AND SYSTEMS FOR EFFICIENTLY BRIEFING PAST COCKPIT CONVERSATIONS

(71) Applicant: HONEYWELL INTERNATIONAL INC., Charlotte, NC (US)

(72) Inventors: Gobinathan Baladhandapani, Madurai (IN); Hariharan Saptharishi, Madurai (IN); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 896 days.

(21) Appl. No.: 17/226,358

(22) Filed: Apr. 9, 2021

(65) Prior Publication Data
US 2022/0267023 A1    Aug. 25, 2022

(30) Foreign Application Priority Data
Feb. 25, 2021  (IN) .............................. 202111007981

(51) Int. Cl.
| | | |
|---|---|---|
| G10L 15/26 | (2006.01) | |
| B64D 45/00 | (2006.01) | |
| G06F 16/635 | (2019.01) | |
| G06F 16/638 | (2019.01) | |
| G08G 5/00 | (2006.01) | |

(52) U.S. Cl.
CPC ............ B64D 45/00 (2013.01); G06F 16/635 (2019.01); G06F 16/638 (2019.01); G08G 5/0013 (2013.01); *B64D 2045/0065* (2013.01)

(58) Field of Classification Search
CPC ............ B64D 45/00; B64D 2045/0065; G06F 16/635; G06F 16/638; G06F 16/65; G06F 40/30; G06F 40/279; G06F 9/54; G06F 40/166; G08G 5/0013; G08G 5/0021; G08G 5/0052; G10L 13/00; H04L 51/212; H04L 51/063
USPC .......................................................... 704/276
See application file for complete search history.

(56) References Cited

U.S. PATENT DOCUMENTS

| | | |
|---|---|---|
| 5,826,206 A | 10/1998 | Nemeth |
| 6,289,304 B1 | 9/2001 | Grefenstette |

(Continued)

FOREIGN PATENT DOCUMENTS

CN        101257461 A       9/2008

*Primary Examiner* — Md S Elahee
(74) *Attorney, Agent, or Firm* — Lorenz & Kopf LLP

(57) ABSTRACT

Systems and methods for debriefing an offboard pilot by enabling a dynamic priority filter to identify relevant voice communications recorded by a playback system in conversations between air traffic control and a pilot by transcribing, the conversations recorded by the playback system, for processing; identifying text content transcribed in the conversations using a speech engine for analysis of the text content for filtering into a set of multiple levels wherein each level contains a set of text messages; tagging at least one text message associated with context with a contextual tag to identify a category in-flight events with the at least one text message; assigning a priority to the at least one tagged text message to generate at least one set of priority tagged messages; enabling the offboard pilot to select based on a category and priority a set of tagged messages; and displaying the set of tagged messages.

20 Claims, 8 Drawing Sheets

(56) References Cited

U.S. PATENT DOCUMENTS

| | | | |
|---|---|---|---|
| 7,756,535 B1* | 7/2010 | Diao | H04L 51/212 |
| | | | 709/206 |
| 8,498,872 B2 | 7/2013 | White et al. | |
| 8,560,314 B2 | 10/2013 | Koll et al. | |
| 8,655,662 B2* | 2/2014 | Schroeter | G10L 13/00 |
| | | | 704/246 |
| 9,558,669 B2 | 1/2017 | Whitlow et al. | |
| 9,620,020 B2 | 4/2017 | Wang et al. | |
| 9,665,645 B2 | 5/2017 | Hawley | |
| 9,772,816 B1 | 9/2017 | Bigham et al. | |
| 9,830,910 B1 | 11/2017 | Shapiro et al. | |
| 10,275,427 B2 | 4/2019 | Saptharishi et al. | |
| 10,535,351 B2 | 1/2020 | Gaston et al. | |
| 11,003,839 B1* | 5/2021 | Hatch | G06F 40/166 |
| 2013/0028174 A1* | 1/2013 | Cabos | H04L 51/063 |
| | | | 370/316 |
| 2015/0139441 A1 | 5/2015 | Kawalkar | |
| 2015/0162001 A1 | 6/2015 | Kar et al. | |
| 2017/0287467 A1 | 10/2017 | Lafon et al. | |
| 2018/0012598 A1 | 1/2018 | Thirukovalluru et al. | |
| 2019/0361694 A1* | 11/2019 | Gordon | G06F 9/54 |
| 2020/0380958 A1 | 12/2020 | Srinivasan et al. | |

* cited by examiner

METHODS AND SYSTEMS FOR EFFICIENTLY BRIEFING PAST COCKPIT CONVERSATIONS

CROSS REFERENCE TO RELATED APPLICATION

This application claims priority to Indian Provisional Patent Application No. 202111007981, filed Feb. 25, 2021, the entire content of which is incorporated by reference herein.

TECHNICAL FIELD

The subject matter described herein relates generally to vehicle systems, and more particularly, embodiments of the subject matter relate to avionics systems and methods using speech recognition for transcribing Air Traffic Controller (ATC) voice communications with the cockpit to enable cockpit personnel to query the transcribed communications for at least required ATC clearance communications.

BACKGROUND

Aircraft manufacturers are considering implementing the so-called "Single-Pilot Cruise Concept" (SPCC), for long-haul operations. The concept holds that only one pilot would be required to remain at the controls for extended periods during the cruise phase while the other pilot(s) in the crew would be resting in an area out of the flight deck. In other words, a single pilot would be flying solo in an aircraft ordinarily designed to be operated by two pilots. However, obstacles remain in implementing this concept such as the efficient debriefing of the replacement (or switching out) of the single pilot with another pilot that was not present in the cockpit and had been resting during the long-haul pilot. Having the replacement pilot in the cockpit for extended lengths of time with the prior single pilot to debrief the replacement pilot of activities and conversations with ATC, other aircraft, crew, etc. would be self-defeating to the single pilot concept as it would cause both pilots to be in the cockpit during cruise times thereby taking up rest time allocated to the alternate pilot.

Also, flight and rest time for each pilot is regulated on long-haul flights by the FAA under the mandatory airline Fatigue Risk Management Plan (FRMP) to prevent pilots from facing fatigue and being overworked, task saturated, and possibly fatigued. For example, the FAA defines flight time as the period during which the plane is under power and capable of movement. This includes not only the actual flight time but also tasks such as taxiing, deicing, and waiting time if the engines are on. Hence, in the single cruise concept, the pilot flight time (time in the cockpit) is valuable, should be minimized and carefully monitored to not exceed FRMP regulations.

Current playback and transcription systems in aircraft cockpit systems to debrief a pilot suffer from various drawbacks such as lacking sufficient intelligent or intuitive features to enable fast insight and glimpses of the cockpit of material aspects of cockpit events and discussions. The systems may require a cumbersome operation that causes the pilot to have to scroll through complete lists of conversations to find snippets of important information; lack color or hue text highlighting that can emphasize various commands given by controllers during the flight conversations between the pilot. Finally, such systems lack convenient means for showing any pending conditional clearance instructions that are usually deemed of higher importance and may require closer or fairly immediate attention and response by the offboard pilot.

It is desirable to provide methods and systems to debrief a pilot to overcome at least the obstacles described by using a dynamic priority filter that aids in the quick and efficient debriefing of prior recorded conversations for an offboard pilot.

Other desirable features and characteristics of the methods and systems will become apparent from the subsequent detailed description and the appended claims, taken in conjunction with the accompanying drawings and the preceding background.

BRIEF SUMMARY

Aircraft systems and related operating methods for debriefing an offboard pilot are provided.

In at least one exemplary embodiment, a method for debriefing an offboard pilot about prior pilot voice communications during a flight is provided. The method includes configuring a debriefing system with a dynamic priority filter to identify relevant voice communications recorded by a playback system in conversations between air traffic control (ATC) and a pilot to debrief the offboard pilot by: transcribing, the conversations recorded by the playback system, for processing by the dynamic priority filter of the debriefing system; identifying, by the dynamic priority filter, text content transcribed in the conversations using a speech engine for analysis of the text content for filtering into a set of multiple levels wherein each level contains a set of text messages; tagging at least one text message associated with context with a contextual tag to identify a category in-flight events with at least one text message; assigning a priority to at least one tagged text message to generate at least one set of priority tagged messages; enabling the offboard pilot to select based on a category and priority at least one set of tagged messages; and displaying the selected set of tagged messages wherein the selected set of tagged messages are displayed in a chronological listing for associating a flight event.

In at least one exemplary embodiment, the method includes defining by the debriefing system, the multiple levels, into a set of levels from a low to a high level that are classified according to a priority level for a review in a particular order by the offboard pilot.

In at least one exemplary embodiment, the method includes displaying, by the debriefing system, the set of messages with the priority level, to enable a priority order review from high to low priority.

In at least one exemplary embodiment, the method includes enabling, by the debriefing system, a display zoom feature that corresponds to low to high priority levels for displaying a set of text messages in accordance with a text message set associated priority level.

In at least one exemplary embodiment, the method includes enabling, by the debriefing system, a manual selection of a priority level for displaying a set of text messages in a display.

In at least one exemplary embodiment, the method includes displaying, by the debriefing system, a set of text messages, within a cockpit instrument display in chronological order and in different colors for enabling a visual color-based priority order review and for enabling simultaneous viewing of the cockpit instrument display to maintain pilot situational awareness while reviewing multiple sets of text messages prioritized by color.

In at least one exemplary embodiment, the method includes interleaving, by the debriefing system, text messages distinguished by color in the cockpit instrument display while maintaining the chronological order.

In at least one exemplary embodiment, the method includes reducing, by the debriefing system, the set of text messages contained in a mobile display, by manual selection of the zoom feature in accordance with the priority level associated with each text message.

In another exemplary method, a computer-readable medium having computer-executable instructions stored thereon that, when executed by a processor of debriefing system, to cause the processor to: debrief an offboard pilot about prior pilot voice communications during a flight; enable a dynamic priority filter of the debriefing system to identify relevant voice communications recorded by a playback system in conversations between air traffic control (ATC) and a pilot to debrief the offboard pilot by: transcribe the conversations recorded by the playback system to process by the dynamic priority filter of the debriefing system; identify, by the dynamic priority filter, text content transcribed in the conversations using a speech engine for analysis of the text content for filtering into a set of multiple levels wherein each level contains a set of text messages; tag at least one text message associated with context with a contextual tag to identify a category in-flight events with at least one text message; assign a priority to at least one tagged text message to generate at least one set of priority tagged messages; enable the offboard pilot to select based on a category and priority at least one set of tagged messages; and display the selected set of tagged messages wherein the selected set of tagged messages are displayed in a chronological listing for associating a flight event.

In at least one exemplary embodiment, the method includes the computer-readable medium when executed by a processor of debriefing system, cause the processor to define the multiple levels, into a set of levels from a low to a high level that is classified according to a priority level for a prioritized review by the offboard pilot.

In at least one exemplary embodiment, the method includes the computer-readable medium, when executed by a processor of debriefing system, cause the processor to display the set of messages with a priority level, to enable a priority order review from high to low priority.

In at least one exemplary embodiment, the method includes the computer-readable medium, when executed by a processor of debriefing system, to cause the processor to enable a display zoom feature that corresponds to low to high priority levels for displaying a set of text messages in accordance with a text message set associated priority level.

In at least one exemplary embodiment, the method includes the computer-readable medium, when executed by a processor of debriefing system, cause the processor to: enable a manual selection of a priority level for displaying a set of text messages in a display.

In at least one exemplary embodiment, the method includes the computer-readable medium of claim 9, when executed by a processor of debrief system, cause the processor to:

display a set of text messages, within a cockpit instrument display in chronological order and in different colors for enabling a visual color-based priority order review and for enabling simultaneous viewing of the cockpit instrument display to maintain pilot situational awareness while reviewing multiple sets of text messages prioritized by color.

In at least one exemplary embodiment, the method includes the computer-readable medium, when executed by a processor of debriefing system, which causes the processor to interleave text messages distinguished by color in a cockpit instrument display while maintaining chronological order.

In at least one exemplary embodiment, the method includes the computer-readable medium, when executed by a processor of debriefing system, cause the processor to reduce the set of text messages contained in a mobile display, by manual selection of the zoom feature in accordance with the priority level associated with each text message.

In yet another exemplary embodiment, an aircraft system is provided. The system includes a debriefing system integrated with cockpit display and comprising a processing system wherein the debriefing system is in communication with a playback system, the debriefing system configured to: debrief an offboard pilot about prior pilot voice communications during a flight; enable a dynamic priority filter to identify relevant voice communications recorded by a playback system in conversations between air traffic control (ATC) and a pilot to debrief the offboard pilot by: transcribe the conversations recorded by the playback system to process by the dynamic priority filter; identify, by the dynamic priority filter, text content transcribed in the conversations using a speech engine for analysis of the text content for filtering into a set of multiple levels wherein each level contains a set of text messages; tag at least one text message associated with context with a contextual tag to identify a category in-flight events with at least one text message; assign a priority to that at least one tagged text message to generate at least one set of priority tagged messages; enable the offboard pilot to select based on a category and priority at least one set of tagged messages; and display the selected set of tagged messages wherein the selected set of tagged messages are displayed in a chronological listing for associating a flight event.

In at least one exemplary embodiment, the system includes the aircraft system further including the debriefing system configured to display the set of messages in accordance with the priority level to enable a priority order review from high to low priority.

In at least one exemplary embodiment, the system includes the aircraft system further including the debriefing system configured to enable a display zoom feature that corresponds to low to high priority levels for displaying a set of text messages in accordance with a text message set associated priority level.

In at least one exemplary embodiment, the system includes the aircraft system further including the debriefing system configured to display a set of text messages, within a cockpit instrument display in chronological order and in different colors for enabling a visual color-based priority order review and for enabling simultaneous viewing of the cockpit instrument display to maintain pilot situational awareness while reviewing multiple sets of text messages prioritized by color.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
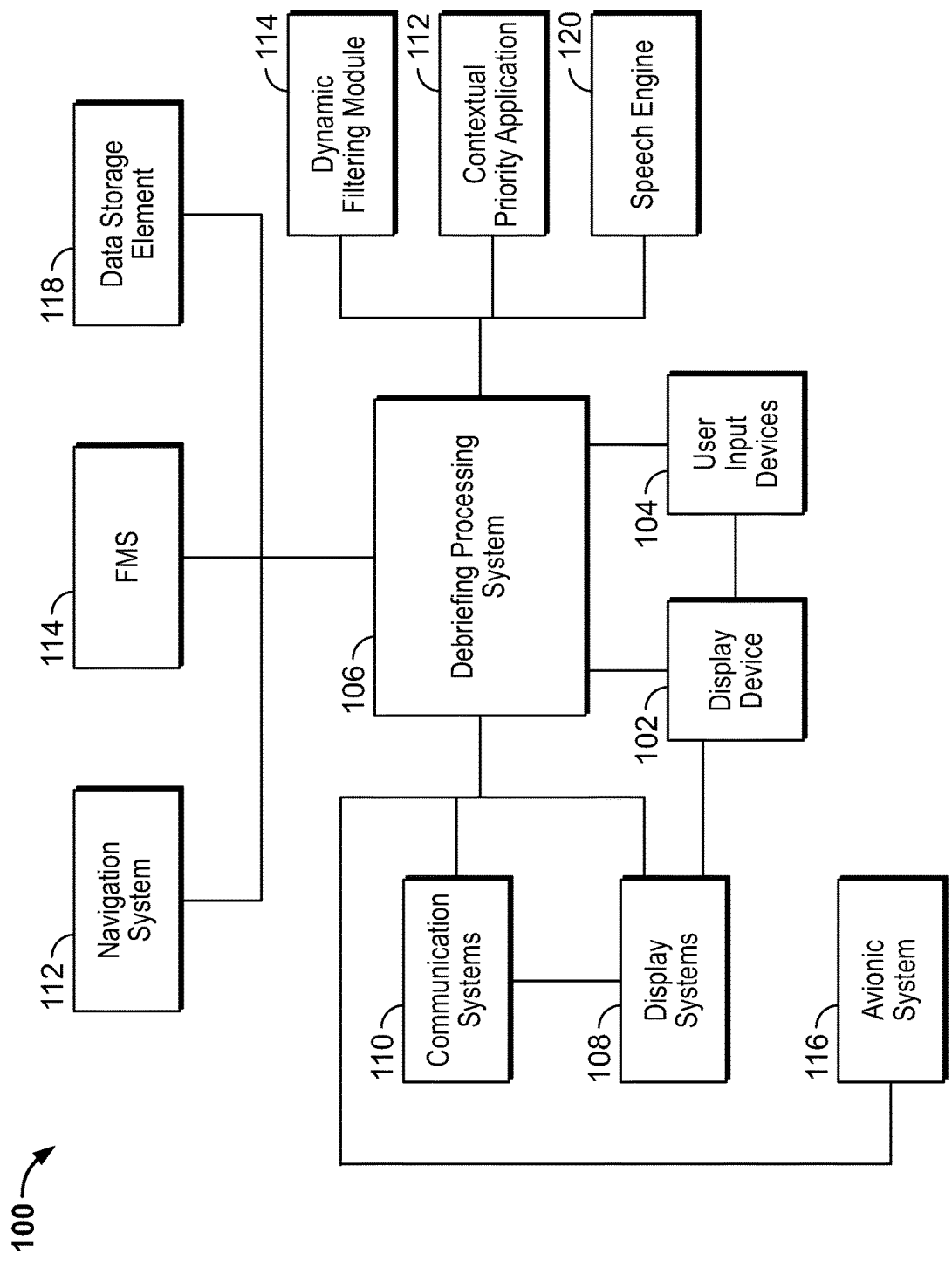
FIG. 1 illustrates an exemplary embodiment of the debriefing system that can be implemented with aircraft systems in accordance with various embodiments.

The following detailed description is merely exemplary in nature and is not intended to limit the subject matter of the application and uses thereof. Furthermore, there is no intention to be bound by any theory presented in the preceding background, brief summary, or the following detailed description.

In an exemplary embodiment, the present disclosure addresses an obstacle in implementing the single pilot cruise of efficiently debriefing the offboard pilot with the lesser time required by the ATC-pilot. The ATC-Pilot conversation plays the key role of debriefing offboard pilots. Further, going through all the conversations by the off-board pilot and the ATC-pilot is both time-consuming and cumbersome. For example, in certain circumstances, the ATC-pilot and offboard pilot may both together review or the offboard pilot will painstakingly go through every aspect of all the prior conversations. However, this may not always be necessary, and in instances, the offboard pilot may need only have to review certain events and be given the gist of some conversations (a priority list of conversations).

In various exemplary embodiments, the present disclosure describes methods and systems of a debriefing process using a dynamic priority filter that aids in the quick and efficient briefing of prior conversations. The dynamic priority filter of the debriefing system dynamically enables the pilot to select the level of the filter and to divide the conversation into multiple levels assigning a priority level to each level. Also, to enable the pilot to filter conversation segments based on a selected priority level and to list the conversation segments in chronological order for viewing. Further, the multiple levels of conversation may also be screened based on the context. The conversations that are received are either voice conversations from a playback operation, stored conversations relating to clearance operations, or text segments associated with pilot ATC conversations.

In an exemplary embodiment, the dynamic priority filter of the debriefing system implements a contextual priority tagger application that operates to tag parts of speech identified in a conversation. The speech parts may include categories such as "Greetings", "Mic check", "Traffic", "Past Traffic", "Conditional Clearance", "Sector handoff", "Readback" etc. The contextual priority tagger categorizes the identified parts based on the context for storage and processing. A clearance part of a speech may be, in instances, composed of multiple categories and multiple priority levels.

The Air Traffic Controller (ATC) voice communications are conversations that occur during the flight between the pilot or crewmembers onboard the aircraft and also with other aircraft within controlled airspace. The ATC and the pilot(s) are in constant communication over a selected voice channel or via the Controller Pilot Data Link Communication (CPDLC) throughout the flight.

Further, as explained in the single pilot cruise concept the emerging need for efficient offboard pilot debriefing currently occurs by the offboard pilot having to listen to lengthy recorded conversations or to view a pilot-ATC conversation interface of pilot conversations. As mentioned, this is time-consuming, and also can be mundane which can result in the offboard pilot missing critical clearance data. Hence, enhanced intuitive user interfaces that enable faster processing (dissecting) of recorded conversations and identifying higher value information likely can provide fewer chances to miss critical clearance data.

The present disclosure provides methods and systems for enhanced debriefing processes with intelligence and an intuitive hue (i.e., color distinguished) enabled text of conversation segments in a display system. For example, the pilot can review filtered data from certain sources that are colored-coded based on the priority that provides a faster and short time for review.

In various exemplary embodiments, the present disclosure provides methods and systems that overcome playback features in an audio panel in aircraft systems that store fixed amounts of past clearance data because of memory limitation preventing storing of complete clearance details by providing a preferred pilot time window feature for displaying to the pilot (i.e., the offboard pilot), the ATC-pilot conversations.

In various exemplary embodiments, the present disclosure provides methods and systems that not only assists the offboard pilot in debriefing but also assistants in a dual pilot in post-flight debriefings and analysis by enabling both pilots to preview past clearances and for the refreshment of past conversations based on various selected criteria in the discussions.

It is desirable for a system wherein the pilot can get the required data accurately and with the reduced time taken to discover and extract the required information in a conversation with the ATC. In various exemplary embodiments, the present disclosure provides enhancements to methods and systems that provide playback and recording capabilities.

For example, digital recorders are capable of playback capability but fail to provide adequate means for the pilot to conveniently and accurately locate instructions that can be buried in limited recorded.

In various exemplary embodiments, the present disclosure describes aspects of a voice-activated flight deck method and system that enables speech recognition or brings a speech recognition system into the cockpit.

In various exemplary embodiments, the present disclosure describes aspects of a debriefing method and system that is configurable for use and/or access with a multitude of device types that include a cockpit device, a mobile device, EFB, a smartphone, etc.

For purposes of explanation, the subject matter is primarily described herein in the context of aircraft operating in controlled airspace; however, the subject matter described herein is not necessarily limited to aircraft or avionic environments, and in alternative embodiments, may be implemented equivalently for ground operations, marine operations, or otherwise in the context of other types of vehicles and travel spaces.

FIG. 1 illustrates an exemplary embodiment of the debriefing system 100 that can be implemented with aircraft systems in accordance with various embodiments. System 100 includes, without limitation, a display device 102, one or more user input devices 104, a debriefing processing system 106, a display system 108, a communications system 110, a navigation system 112, a flight management system (FMS) 114, one or more avionics systems 116 (i.e., playback system for transcribing conversation content), and a data storage element 118 suitably configured to support the operation of the system 100, as described in greater detail below.

In exemplary embodiments, the display device 102 is realized as an electronic display capable of graphically displaying flight information or other data associated with the operation of the aircraft under the control of the display system 108 and/or debriefing processing system 106. In this regard, the display device 102 is coupled to the display system 108 and the debriefing processing system 106, wherein the debriefing processing system 106 and the display system 108 are cooperatively configured to display, render, or otherwise convey one or more graphical representations or images associated with the operation of the aircraft on the display device 102. The user input device 104 is coupled to the debriefing processing system 106, and the user input device 104 and the debriefing processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key, or another suitable device adapted to receive input from a user. In some embodiments, the user input device 104 includes or is realized as an audio input device, such as a microphone, audio transducer, audio sensor, or the like, that is adapted to allow a user to provide audio input (i.e., request from the pilot) to the system 100 in a "hands-free" manner without requiring the user to move his or her hands, eyes and/or head to interact with the system 100.

The debriefing processing system 106 generally represents the hardware, software, and/or firmware components configured to facilitate communications and/or interaction between the elements of the system 100 and perform additional tasks and/or functions to support the operation of the system 100, as described in greater detail below. Depending on the embodiment, the debriefing processing system 106 may be implemented or realized with a general-purpose processor, a content addressable memory, a digital signal processor, an application-specific integrated circuit, a field-programmable gate array, any suitable programmable logic device, discrete gate or transistor logic, processing core, discrete hardware components, or any combination thereof, designed to perform the functions described herein. The debriefing processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the debriefing processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the debriefing processing system 106, or in any practical combination thereof. For example, in one or more embodiments, the debriefing processing system 106 includes or otherwise accesses a data storage element (or memory), which may be realized as any sort of non-transitory short- or long-term storage media capable of storing programming instructions for execution by the debriefing processing system 106. The code or other computer-executable programming instructions, when read and executed by the debriefing processing system 106, cause the processing system debriefing 106 to support or otherwise perform certain tasks, operations, functions, and/or processes described herein. In an exemplary embodiment, the debriefing system 106 communicates with or hosts a dynamic priority filtering 114, a contextual textual priority application 112, and a speech engine 120 that performs functionalities related to identifying conversation content, tagging parts of conversation text, and speech to text conversion and identification.

The display system 108 generally represents the hardware, software, and/or firmware components configured to control the display (including zoom level, priority and zoom level, and the number of conversation text segments displayed) and/or rendering of one or more navigational maps and/or other displays about the operation of the aircraft and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In exemplary embodiments, the aircraft debriefing system 100 includes a data storage element 118, which contains aircraft procedure information (or instrument procedure information) for a plurality of airports and maintains an association between the aircraft procedure information and the corresponding airports. Depending on the embodiment, the data storage element 118 may be physically realized using RAM, ROM memory, flash memory, registers, a hard disk, or another suitable data storage medium known in the art or any suitable combination thereof.

As used herein, aircraft procedure information should be understood as a set of operating parameters, constraints, or instructions associated with a particular aircraft action (e.g., approach, departure, arrival, climbing, and the like) that may be undertaken by the aircraft at or in the vicinity of a particular airport.

Each airport may have one or more predefined aircraft procedures associated therewith, wherein the aircraft procedure information for each aircraft procedure at each respective airport may be maintained by the data storage element 118. Still referring to FIG. 1, in an exemplary embodiment, the processing system 106 is coupled to the navigation system 112, which is configured to provide real-time navigational data and/or information regarding the operation of the aircraft. The navigation system 112 is also capable of obtaining or otherwise determining the heading of the aircraft (i.e., the direction the aircraft is traveling in relative to some reference). In the illustrated embodiment, the debriefing processing system 106 is also coupled to the communications system 110, which is configured to support communications to and/or from the aircraft. For example, the communications system 110 may support communications between the aircraft and air traffic control or another suitable command center or ground location. In this regard, the communications system 110 may be realized using a radio communication system and/or another suitable data link system.

In an exemplary embodiment, the debriefing processing system 106 is also coupled to the FMS 114, which is coupled to the navigation system 112, the communications system 110, and one or more additional avionics systems 116 to support navigation, in-flight ATC conversation recording, flight planning, and other aircraft control functions conventionally, as well as to provide real-time data and/or information regarding the operational status of the aircraft to the processing system 106. Although FIG. 1 depicts a single avionics system 116, in practice, the system 100 and/or aircraft will likely include numerous avionics systems for obtaining and/or providing real-time flight-related information that may be displayed on the display device 102 or otherwise provided to a user (e.g., a pilot, a co-pilot, or crew member).

It should be understood that FIG. 1 is a simplified representation of the debriefing system 100 for purposes of explanation and ease of description and FIG. 1 is not intended to limit the application or scope of the subject matter described herein in any way. It should be appreciated that although FIG. 1 shows the display device 102, the user input device 104, and the debriefing processing system 106 as being located onboard the aircraft (e.g., in the cockpit), in practice, one or more of the display device 102, the user input device 104, and/or the debriefing processing system 106 may be located outside the aircraft (e.g., on the ground as part of an air traffic control center or another command center) and communicatively coupled to the remaining elements of the debriefing system 100 (e.g., via a data link and/or communications system 110). Similarly, in some embodiments, the data storage element 118 may be located outside the aircraft and communicatively coupled to the debriefing processing system 106 via a data link and/or communications system 110.

Figure 2:
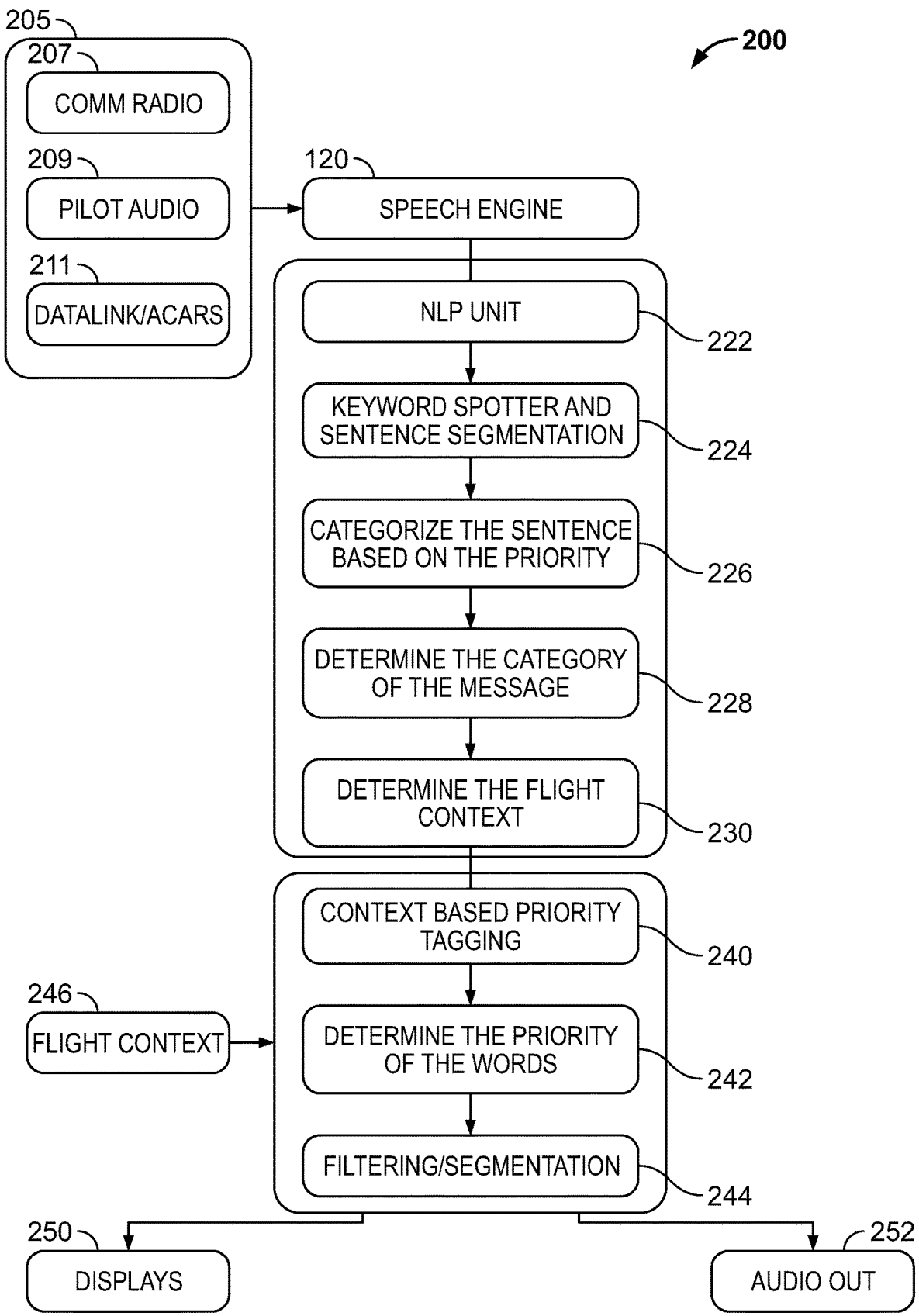
FIG. 2 depicts an exemplary block diagram of a debriefing system implementing the dynamic priority filter with the contextual priority tagger in accordance with an exemplary embodiment.

FIG. 2 depicts an exemplary flow diagram of a debriefing system of the processing of received conversation and implementing the dynamic priority filter with the contextual priority tagger in accordance with an exemplary embodiment. In FIG. 2, the aircraft communication system 205 includes a communication radio 207 for receiving and sending voice communications between the pilot and the controller, other pilot cockpit audio recorded 209, and a datalink system 211. The output from the communication system 205 is received by the speech engine 120 that has a natural language processing (NLP) unit 222 for performing voice processing of voice conversations that occurred between the pilot and the controller during the flight. The NLP unit 222 is configured with a number of applications that enable speech analysis of the audio voice conversations that are received. In an exemplary embodiment, the NLP unit 222 is configured with speech analysis applications that include an application 224 for spotting keywords and sentence segments in voice conversations. Also, the NLP unit 222 is configured with an application 226 that categorizes sentences based on priority 226. Application 226 may also be configured to categorize sentence segments from application 224. Further, an application 228 to determine a category of the message captured in the voice conversations and an application 230 to determine the flight context on the captured message. The output from the NLP unit 222 after the speech analysis is performed by the various applications (224, 226, 228, 230) is received by a context-based priority tagging module 240 that is also configured to receive input from a flight context module 246 about the flight phase. The context-based priority tagging module 240 performs a dual analysis of determining the priority of the words by application 242 and filtering or segmenting the words and phrases received by application 224. Once completed, the output from the context-based priority module 240 is sent to various cockpit displays 250 and configured as an audio out 252 for communication on the aircraft audio systems to the pilot.

Figure 3:
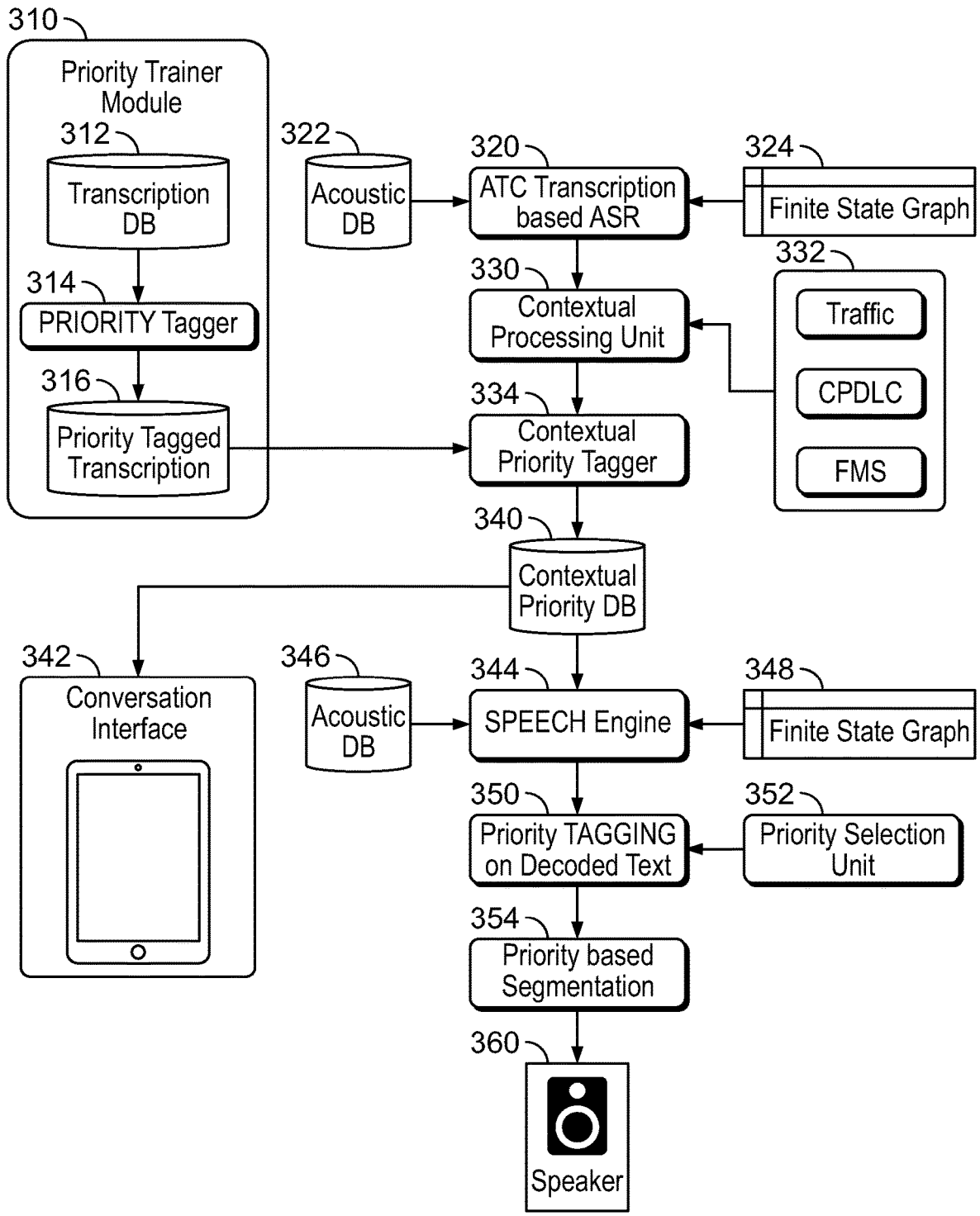
FIG. 3 a process diagram of the received audio input that is transcribed and contextual processed, and the subsequent speech analysis for generating the audio output to cockpit speaker of the debriefing system in accordance with an embodiment.

FIG. 3 a process diagram of the received audio input that is transcribed and contextually processed, and the subsequent speech analysis for generating the audio output to cockpit speaker of the debriefing system in accordance with an embodiment. In FIG. 3 there is an initial ATC transcription (based ASR) unit 320 that receives input from an acoustic database 322 and a finite state graph 324 for enhancing received audio voiced in multiple different accents and different aircraft operational states. The output of the transcription unit 320, is sent to a contextual processing unit 330 along with aircraft operating and sensor data from unit 332 that includes output about aircraft traffic, CPDLC, and FMS operational data. The contextual processing unit 300 sends contextual-based information to the contextual priority tagger 334. The contextual priority tagger 334 processes the contextual-based information with input from a priority trainer module 310. The priority trainer module 310 that provides the input information to the contextual priority tagger module 334 includes the components of a transcription database 312, a priority tagger 314, and a repository 316 of priority tagged transcription. Once the information is processed by the contextual priority tagger 334, the processed contextual priority tagged data is stored in a contextual priority database 340 and presented in part on a conversation interface 342 for display in debriefing the pilot. Also, information is received from the contextual priority database 340 for further processing by the speech engine 344. The speech engine 344 performs an NLP analysis of the contextual priority information received and is configured with acoustic data from an acoustic database 346 and finite stage graph 348 input for enhanced speech processing. Once processed and deciphered into text by the speech engine 344, the text is sent for priority-based tagging. Once, the priority-based tagging is executed, the text that is selected for a prioritized tagging is determined or instructed by a priority selection unit 352. Next, a segmentation of the priority tagged text is performed by a priority segmentation module 354 for outputting as audio packets to a speaker in the cockpit to assist in debriefing the pilot.

Figure 4:
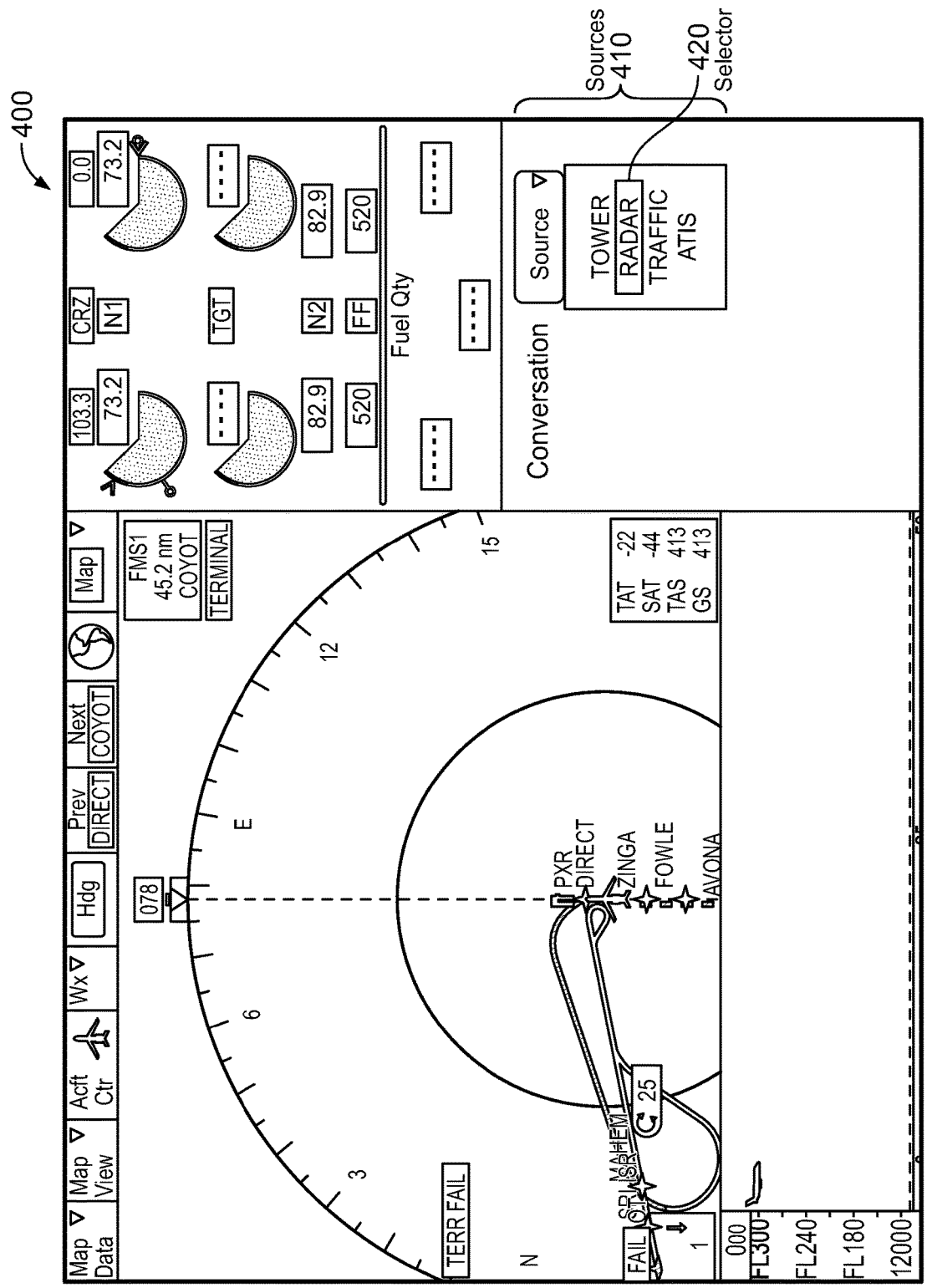
FIG. 4 depicts a display of cockpit instrumentation that enables manual selection by the pilot of a source for attributed conversations that are of interest to the pilot in the debrief system in accordance with an embodiment.

FIG. 4 depicts a display of cockpit instrumentation that enables manual selection by the pilot of a source for attributed conversations that are of interest to the pilot in the debrief system in accordance with an embodiment. In FIG. 4, the pilot, when viewing the cockpit display 400, can select 420 a source from a set of sources 410 that include communications from the tower, about radar matters, associated with aircraft traffic, and related to ATIS. In other words, the pilot can manually choose a source-related subject and be debriefed about conversation filtered from the source selected.

Figure 5:
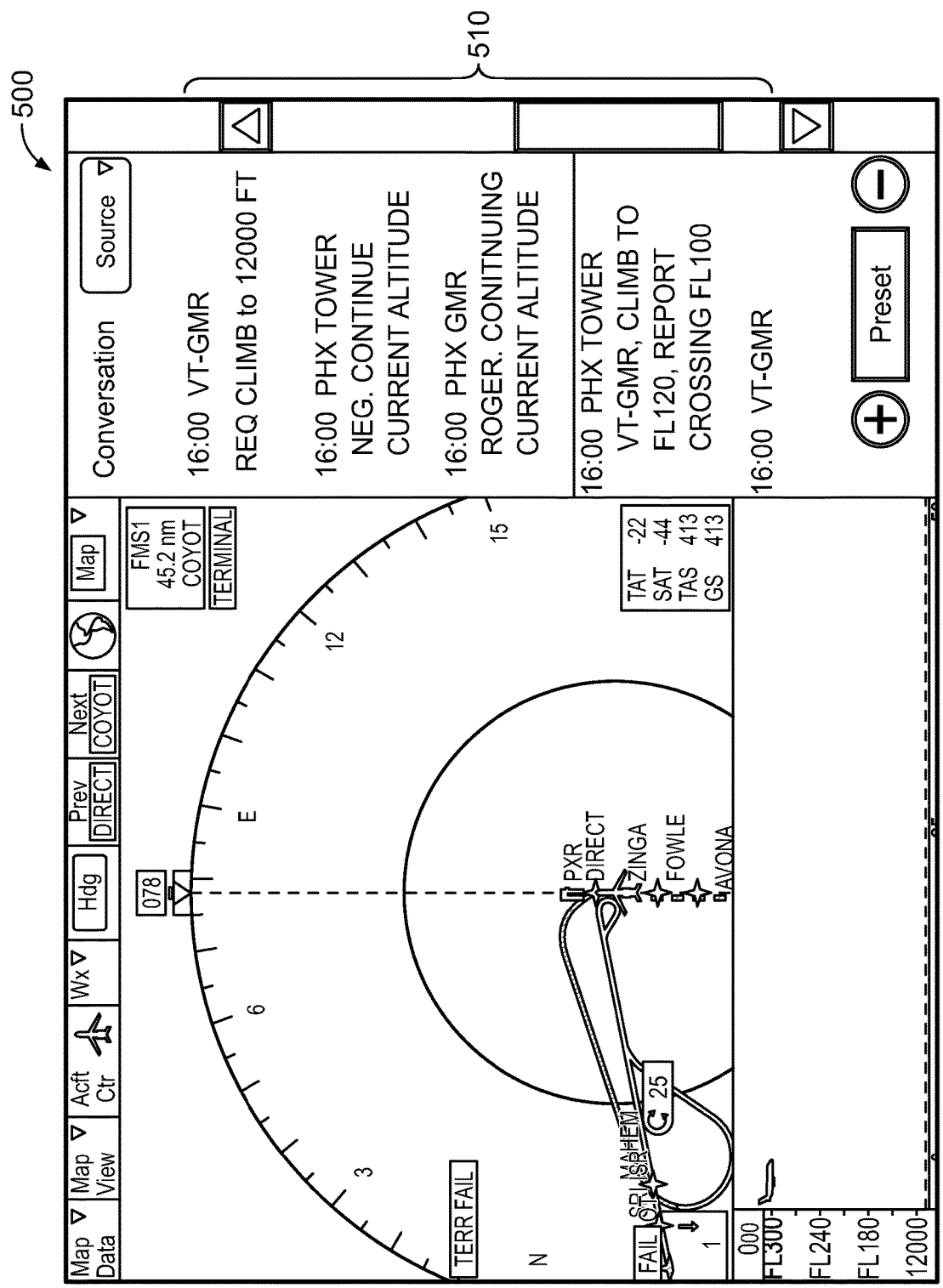
FIG. 5 depicts a display of cockpit instrumentation and an exemplary representation in the cockpit display of a list of time-based text segments color-coded to multiple sources for debriefing displayed by the debrief system in accordance with an embodiment.

FIG. 5 depicts a display of cockpit instrumentation and an exemplary representation in the cockpit display of a list of time-based text segments color-coded to multiple sources for debriefing displayed by the debrief system in accordance with an embodiment. The cockpit display 500 includes a set of text segments 510 in a chronological timeline of conversations that are color-coded to a source. For example, in an embodiment, a green color is associated with text segments displayed in chronological order to tower communication. A different color, such as a white color, is associated with text segments related to a radar source. The radar source white text is displayed and interleaved in chronological order with the other text, the green text (of tower communications) so the pilot can visually differentiate the text source efficiently and further receive a debriefing simultaneously of multiple sources by text segment representations interleaved together in the same timeline. Also, the pilot can visually simultaneously view the instrumentation and not lose situation awareness during the debriefing process.

In an exemplary embodiment, unique graphical symbologies may be displayed in a crew interface overlayed on a moving map (MAP) and may also be configured with waypoints and other route markers for visual correlation with events for engaging and communicating the debriefing system to display corresponding text segments about the associated flight path event activity displayed.

In an exemplary embodiment, the debriefing system includes a priority tagger application (e.g., 240 in FIG. 2). The priority tagger can be trained offline via supervised learning methodologies. Also, online training may occur via non-supervised learning approached and learning curves through usage by the pilot. Once trained, the priority tagger is implemented in use with various aircraft states to develop a contextually based priority tagger. The contextually based priority tagger identifies parts of conversation via natural language processing (NLP) and tags parts of text segments derived from conversations from various sources with the pilot. The aircraft state that is modeled in the contextual priority tagger application may include state data of traffic, weather, clearance, and other aviation operations.

In an exemplary embodiment, a contextual priority tagging model is "CONTINENTAL SIXTY-FIVE ELEVEN YOUR TRAFFIC'S TWELVE O'CLOCK FOUR MILES A DELTA JET AT NINETEEN HUNDRED FEET". In this example, the conversation is tagged as "live traffic" before the aircraft crosses or passes an ownship. Once, the aircraft has passed the ownship, the model will be updated with the tag "past traffic".

As described in the below table, once the contextual priority tagger is categorized, the clearances and conversation can be prioritized in a set of 5 levels consisting of categories and stages as follows:

| | |
|---|---|
| GREETINGS, MIC CHECK | PRIORITY 5 |
| PAST TRAFFIC, PAST WEATHER | PRIORITY 4 |
| PREVIOUS FLIGHT PHASE CLEARANCES, PAST SECTOR CLEARANCES | PRIORITY 3 |
| CONDITIONAL CLEARANCE | PRIORITY 2 |
| CURRENT CLEARANCE that requires attention | PRIORITY 1 |

As shown in the above table, a pilot is enabled by the debriefing application to select the priority desired which will filter extraneous communications not meeting the selected priority level. It is permissible for the pilot to also review the non-selected or less prioritized communications as desired. The priority selection tool or feature provides a convenient selection process for the pilot to eliminate unnecessary conversations and words and to identify clearances that require more immediate attention which in turn caused a more efficient debrief process.

Further, if any clearance or traffic is categorized in a stage and if that priority is not shown to the pilot, its priority will be elevated, so that pilot can view the clearance message.

The contextual Priority tagger and Dynamic Priority Filter pair will be deployed for Clearance playback as well so that the pilot can here whichever has high priority followed by low-level priority items.

The priority filter also shortens the word length in real-time or dynamically, for example, "WE ARE DESCENDING TO 2000 FEET" can be shortened (i.e., reworded) to "DESCENT TO 2000 FT" while retaining a similar contextual meaning.

In an exemplary embodiment, the conversation (text segments) parts that are displayed on a display device with a display screen by implementing a priority filtering schema based on a level from 1 to 5 selected by the pilot or user that corresponds to a zoom level of the display. For example, as shown in the below table, a priority level of 5 displays only the beginning terms "YOU'RE LOUD AND CLEAR WE'RE" of the phrase "YOU'RE LOUD AND CLEAR WE'RE GOING DOWN TO TWELVE FIVE", while the priority 1 level include the additional text "GOING DOWN TO TWELVE FIVE". Also, other displays of text based on the priority level (that also corresponds to the zoom level) are shown.

| | |
|---|---|
| YOU'RE LOUD AND CLEAR WE'RE GOING DOWN TO TWELVE FIVE | YOU'RE LOUD AND CLEAR WE'RE - PRIORITY 5<br>GOING DOWN TO TWELVE FIVE - PRIORITY 1 |
| THIRTY-FIVE FORTY-FIVE GREAT THANKS HAVE A GOOD DAY DELTA FIVE THIRTY-SEVEN | THIRTY-FIVE FORTY-FIVE - PRIORITY 2<br>GREAT THANKS HAVE A GOOD DAY - PRIORITY 5<br>DELTA FIVE THIRTY-SEVEN - PRIORITY 2 |
| IT WAS SET AND I GOT THE IDENT | PRIORITY 5 |
| OKAY EXPECTING LOWER FOR NORTHBOUND TRAFFIC IN ABOUT UH FIVE MILES FOR ONE TANGO HOTEL | OKAY - PRIORITY 5<br>EXPECTING LOWER FOR NORTHBOUND TRAFFIC IN ABOUT UH FIVE MILES FOR ONE TANGO HOTEL - PRIORITY 1 |
| AFTER SUMMA DESCENT 4000 FEET | AFTER SUMMA DESCENT 4000 FEET - PRIORITY 2 TILL 5 NM AWAY FROM SUMMA.<br>PRIORITY 4 - AFTER CROSSING SUMMA |

Figure 6B:
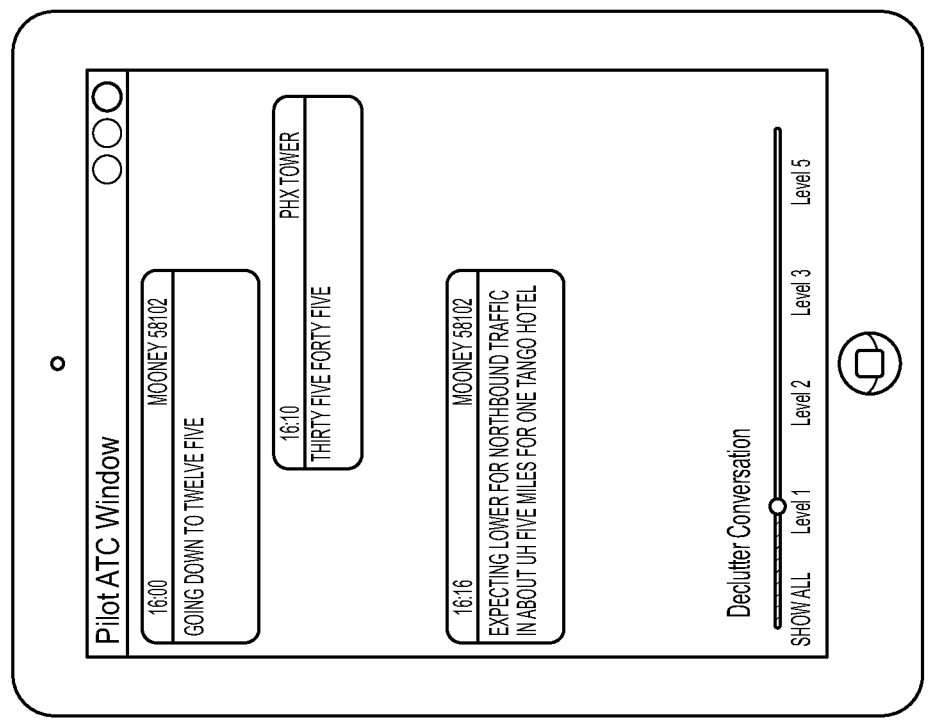
FIGS. 6A and 6B depict a conversation on a mobile device with zoom in and zoom out display features that enable various priority levels of conversations to populate a screen of the mobile device to debrief the pilot by the debriefing system in accordance with an embodiment.
Figure 6A:
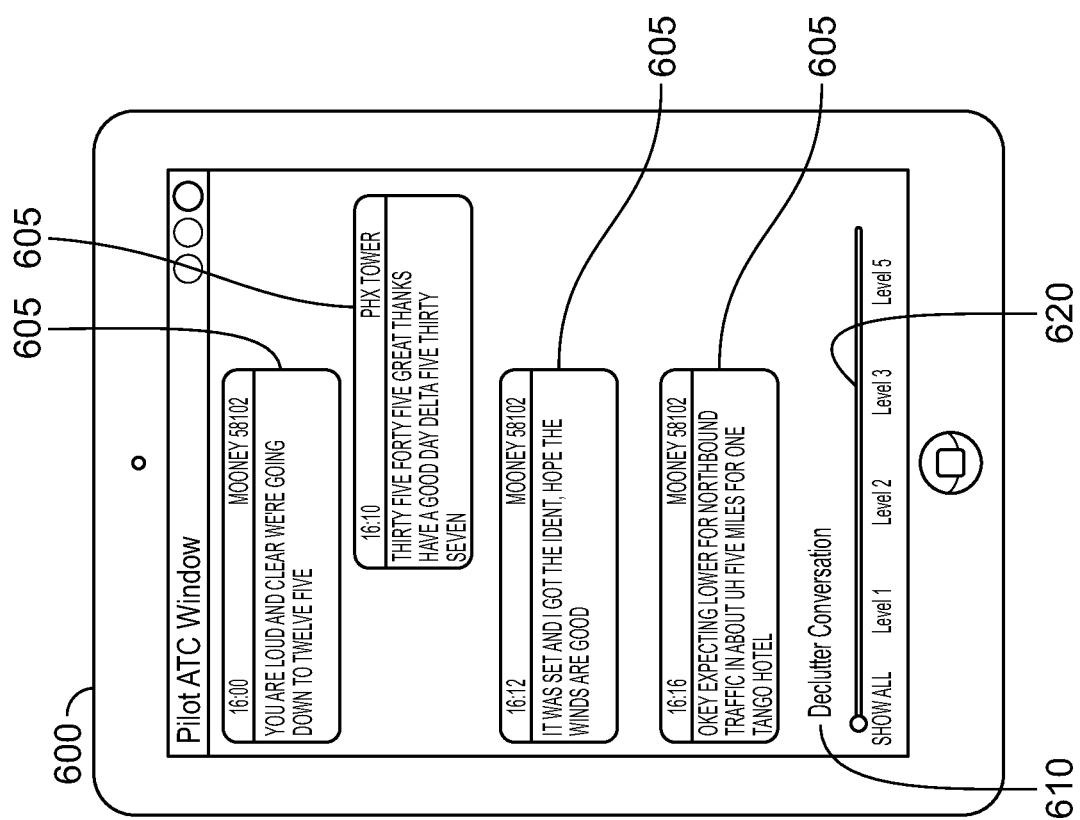

FIGS. 6A and 6B depict a conversation on a mobile device with zoom in and zoom out display features that enable various priority levels of conversations to populate a screen of the mobile device to debrief the pilot by the debriefing system in accordance with an embodiment. FIG. 6A shows a display screen 600 of a pilot air traffic control (ATC) window with text communications 605 between the pilot and the ATC tower. At the base of the display screen, 600 is configured a declutter conversation 610 feature that displays an on-screen slide bar 620 that is segmented into a set of 5 levels labeled as "SHOW ALL", "Level 1", "Level 2", "Level 3" and "Level 5". The user (i.e., the pilot) can slide the selector in a horizontal direction to change the level of zoom from a show all display to various levels of prioritized conversation display. The highest zoom level, in this case, "level 5" corresponds to the highest priority tagged text segment displayed. In FIG. 6A, the screen slide bar 620 of the declutter conversation 610 feature is manually moved to the position labeled "level 1". In this case, the display screen 600 displays all level 1 tagged text segments 605. By using the declutter conversation 610 feature, the pilot can manually filter the conversation segments to display text segments in groups from the lowest to the highest level. For example, as the pilot moves the selector of the screen slide bar 620 to a higher level, then the filters conversation segments 605 consists of only the lowest selected level to the highest level on the screen slide bar 620. In this way, the pilot can narrower the grouping of text segments into smaller groups, eventually zooming in to the highest-level group only. The conversation display is from a full conversation at a Zoom Out to filtered conversation levels in each Zoom in level. Also, a reset selection is provided (not shown). Upon pressing Zoom out by the pilot, the next level priority conversations are populated in a window. Upon pressing Zoom in (the reverse direction), non-priority items are getting removed. The preset option will display the default filtered clearance.

Figure 7B:
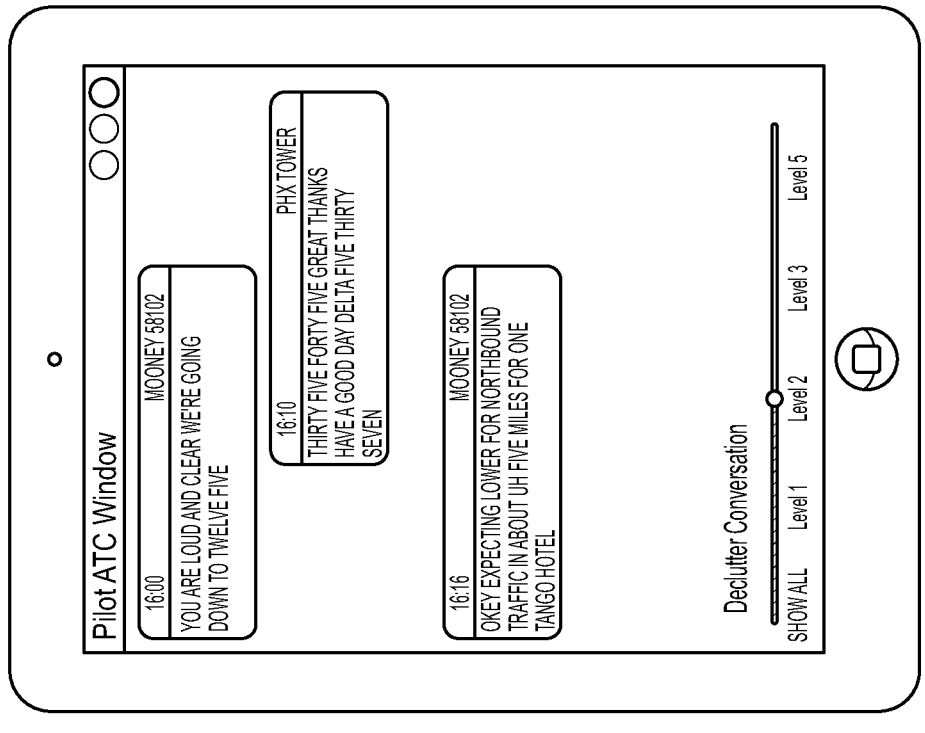
FIGS. 7A and 7B depict a chronological order of the text segments displayed in accordance with levels of the screen slide bar selected by the debriefing system in accordance with an embodiment.
Figure 7A:
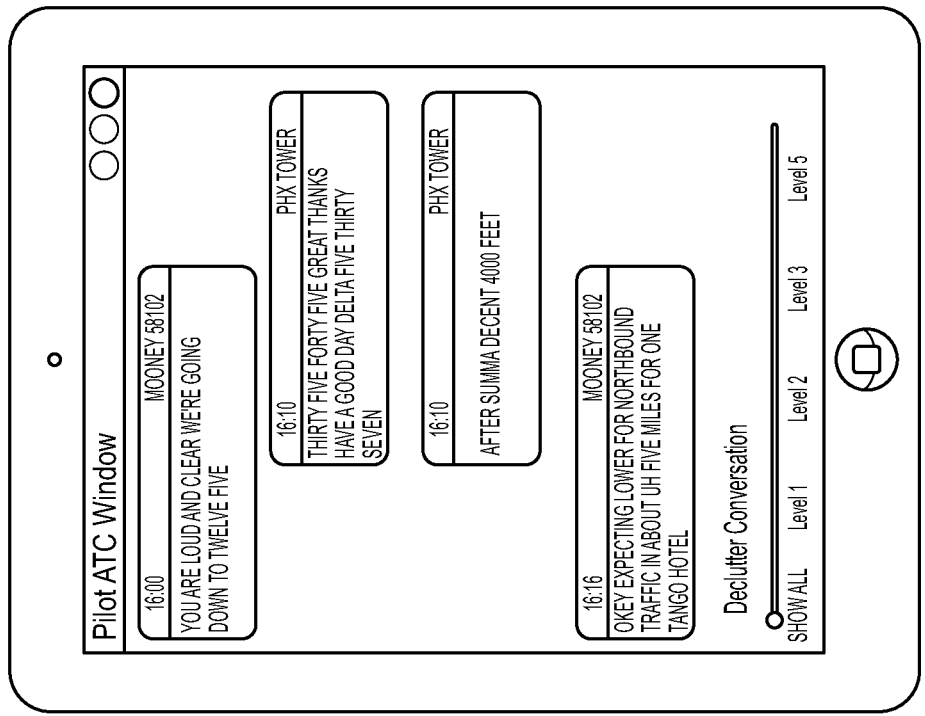

FIGS. 7A and 7B depict a chronological order of the text segments displayed in accordance with levels of the screen slide bar selected by the debriefing system in accordance with an embodiment. In FIG. 7A, at a "show all" level on the screen slide bar, all the conditional clearance-related messages are shown. That is, the priority level tagged shows text segments that constitute all the clearance text segments. In FIG. 7B, as the pilot changes the priority level to a "level 2", the conditional clearance text segment messages are filters. In this case, the conditional clearance text segment messages are filtered to not show text segment messages after the chronological time of the conditional clearance text segment of "AFTER SUMMA DESCENT 4000 FEET" in FIG. 7A. Hence FIG. 7B displays a lesser portion of the clearance text segments that are prioritized by level which corresponds to a chronological time. In an alternate exemplary embodiment, the level 2 zoom-in can also correspond to a priority level.

Figure 8:
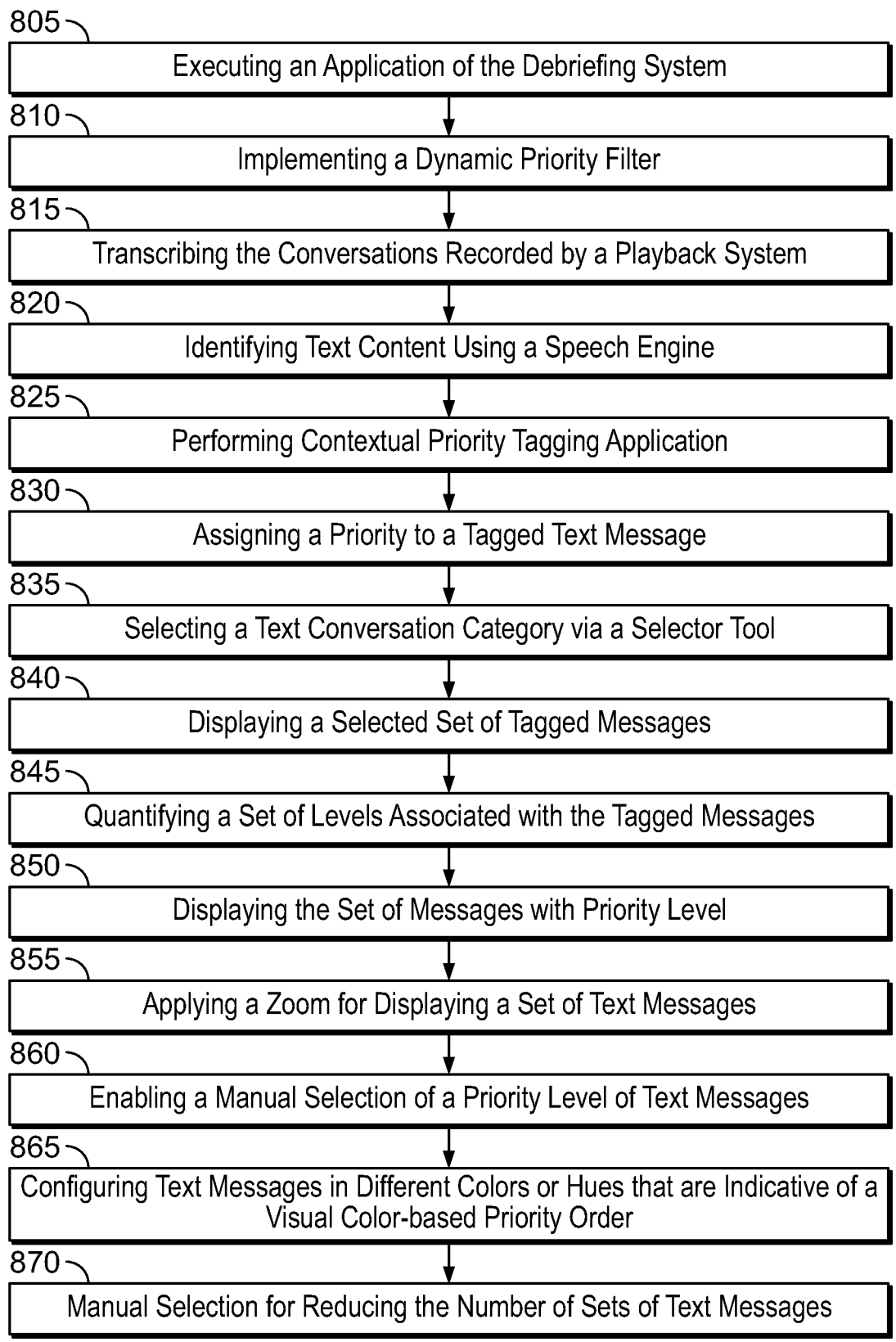
FIG. 8 depicts a flow diagram of a process for implementing the contextual priority filter and the dynamic priority filter of the debriefing system in accordance with an embodiment.

FIG. 8 depicts a flow diagram of a process for implementing the contextual priority filter and the dynamic priority filter of the debriefing system in accordance with an embodiment. Process 800 of the debriefing system includes task 805, initially executing an application of the debriefing system. The debriefing system is executed by the offboard pilot about prior pilot voice communications during a flight, may be executed after the flight for post-flight discussions, or may be executed by the ATC pilot to review past discussions. In other words, there are a variety of use cases for executing the debriefing system. At task 810, the debriefing system uses a dynamic priority filter to identify relevant voice communications recorded by a playback system in conversations between air traffic control (ATC) and a pilot to debrief the offboard pilot. In an exemplary embodiment, the dynamic filter allows the offboard pilot to prioritize the conversation of interest, and eliminate unnecessary conversations (i.e., words, phrases, etc.), and focus on priority events such as clearance discussions that may need immediate attention. At task 815, the debriefing system transcribes the conversations recorded by the playback system of an aviation system and performs further processing with the dynamic priority filter feature.

At task 820, the dynamic priority filter identifies text content transcribed in the conversations using a speech engine which via NLP can perform an analysis of the text content in conversations records for filtering the conversation text content into multiple levels where each level is composed on similar priority text snippets (i.e., a set of text messages) of a conversation related to an event. At task 825, the debriefing system performs via the contextual priority tagging application, a tagging of text messages associated with the context where a contextual tag is implemented to identify a category of in-flight events with an associated text message.

At task 830, the debriefing system assigns a priority to a tagged text message to generate a set of priority tagged messages. At task 835, the offboard pilot can select using the selector tool in the cockpit to display a category and also select a priority based on a level shown in the slide bar display of text messages a set of tagged messages. At task 840, the debriefing system can display the selected set of tagged messages. The selected set of tagged messages may be displayed in a chronological listing for associating a flight event. It is contemplated that a variety of ways may be enabled to display the tagged messages including separate sets of tagged messages, interleaved sets of tagged messages, and chronological listing of certain tagged messages.

At task 845, the debriefing system is configured to define multiple levels as desired and to quantify the levels into a set of levels from a low level to a high level that may correspond to a priority level for convenient reviewing by the offboard pilot in a particular order desired by the offboard pilot. For example, the offboard pilot may simply want to receive information about the gist of multiple conversation events or may want a closer examination of a particular event. At task 850, the debriefing system configured to communicate with a variety of display devices including cockpit displays and mobile device displays in communication with cockpit systems to display the set of messages with the priority level and to enable the offboard pilot to perform a priority order review from high level to the low priority of the set of text messages as desired. At task 855, the debriefing system is configured to enable a display zoom feature that displays a set of text messages based on a level of the zoom to a corresponding low to high priority levels for displaying a set of text messages. The set of text messages can be enlarged or decreased in number by the offboard pilot or other users changing the selector level on the slide display that also corresponds to the associated priority level.

At task 860, the debriefing system is configured to enable a manual selection of a priority level for displaying a set of text messages in a display by using a slide bar that is onscreen touch actuated or actuated by various input devices (i.e., mouse clicks, keyboard strokes, etc.)

At task 865, the debriefing system is configured to display the set of text messages within a cockpit instrument display in chronological order and in different colors or hues that are indicative of a visual color-based priority order and allow for the offboard pilot to quickly review by color like priority text messages. Also, the colored text segments are integrated for review simultaneous while viewing the cockpit instrument display so as an example, the offboard pilot during the review can maintain situational awareness of the aircraft state. This allows the offboard pilot to multi-task and be debriefed while performing flight operations. The interleaved text messages may also be displayed and distinguished by color in the cockpit instrument display while maintaining chronological order.

Finally, at task 870, the debriefing system can reduce the number of sets of text messages contained in a display (i.e., in the mobile display), by manual selection of the zoom feature in the slide bar or elsewhere for creating a page display of text messages in accordance with the desired priority level associated with each text message.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Also, certain terminology may be used in the following description for reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for debriefing an offboard pilot about prior pilot voice communications during a flight, the method comprising:
   configuring a debriefing system with a dynamic priority filter to identify relevant voice communications recorded by a playback system in conversations between air traffic control (ATC) and a pilot to debrief the offboard pilot by:
   transcribing the conversations recorded by the playback system, for processing by the dynamic priority filter of the debriefing system;
   identifying, by the dynamic priority filter, text content transcribed in the conversations using a speech engine for analysis of the text content for filtering into a set of multiple levels, wherein each level contains a set of text messages;
   tagging at least one text message associated with context with a contextual tag to identify a category of in-flight events with the at least one text message;
   assigning a priority to the at least one tagged text message to generate at least one set of priority tagged messages;
   enabling the offboard pilot to select, based on a category and priority, at least one set of priority tagged messages; and
   displaying the selected at least one set of tagged messages, wherein the selected at least one set of tagged messages are displayed in a chronological listing for associating a flight event.

2. The method of claim 1, further comprising:
   defining, by the debriefing system, the set of multiple levels into a set of levels from a low to a high level that are classified according to a priority level for a review in a particular order by the offboard pilot.

3. The method of claim 2, further comprising:
   displaying, by the debriefing system, the set of messages with the priority level, to enable a priority order review from high to low priority.

4. The method of claim 3, further comprising:
   enabling, by the debriefing system, a display zoom feature that corresponds to low to high priority levels for displaying a set of text messages in accordance with a text message set associated priority level.

5. The method of claim 4, further comprising:
   enabling, by the debriefing system, a manual selection of a priority level for displaying a set of text messages in a display.

6. The method of claim 5, further comprising:
   displaying, by the debriefing system, a set of text messages, within a cockpit instrument display in chronological order and in different colors for enabling a visual color-based priority order review and for enabling simultaneous viewing of the cockpit instrument display to maintain pilot situational awareness while reviewing multiple sets of text messages prioritized by color.

7. The method of claim 6, further comprising:
interleaving, by the debriefing system, text messages distinguished by color in the cockpit instrument display while maintaining the chronological order.

8. The method of claim 4, further comprising:
reducing, by the debriefing system, the set of text messages contained in a mobile display, by manual selection of the zoom feature in accordance with the priority level associated with each text message.

9. A non-transitory computer-readable medium having computer-executable instructions stored thereon that, when executed by a processor of debriefing system, to cause the processor to:
debrief an offboard pilot about prior pilot voice communications during a flight;
enable a dynamic priority filter of the debriefing system to identify relevant voice communications recorded by a playback system in conversations between air traffic control (ATC) and a pilot to debrief the offboard pilot by:
transcribe the conversations recorded by the playback system to process by the dynamic priority filter of the debriefing system;
identify, by the dynamic priority filter, text content transcribed in the conversations using a speech engine for analysis of the text content for filtering into a set of multiple levels wherein each level contains a set of text messages;
tag at least one text message associated with context with a contextual tag to identify a category of in-flight events with the at least one text message;
assign a priority to the at least one tagged text message to generate at least one set of priority tagged messages;
enable the offboard pilot to select based on a category and priority at least one set of priority tagged messages; and
display the selected set of tagged messages wherein the selected set of tagged messages are displayed in a chronological listing for associating a flight event.

10. The computer-readable medium of claim 9, when executed by a processor of debrief system, cause the processor to:
define the set of multiple levels, into a set of levels from a low to a high level that is classified according to a priority level for a prioritized review by the offboard pilot.

11. The computer-readable medium of claim 9, when executed by a processor of debrief system, cause the processor to:
display the set of messages with a priority level, to enable a priority order review from high to low priority.

12. The computer-readable medium of claim 9, when executed by a processor of debrief system, cause the processor to:
enable a display zoom feature that corresponds to low to high priority levels for displaying a set of text messages in accordance with a text message set associated priority level.

13. The computer-readable medium of claim 9, when executed by a processor of debrief system, cause the processor to:
enable a manual selection of a priority level for displaying a set of text messages in a display.

14. The computer-readable medium of claim 9, when executed by a processor of debrief system, cause the processor to:
display a set of text messages, within a cockpit instrument display in chronological order and in different colors for enabling a visual color-based priority order review and for enabling simultaneous viewing of the cockpit instrument display to maintain pilot situational awareness while reviewing multiple sets of text messages prioritized by color.

15. The computer-readable medium of claim 9, when executed by a processor of debrief system, cause the processor to:
interleave text messages distinguished by color in a cockpit instrument display while maintaining chronological order.

16. The computer-readable medium of claim 12, when executed by a processor of debrief system, cause the processor to:
reduce the set of text messages contained in a mobile display, by manual selection of the zoom feature in accordance with the priority level associated with each text message.

17. An aircraft system comprising:
a debriefing system integrated with cockpit display and comprising a processing system wherein the debriefing system is in communication with a playback system, the debriefing system configured to:
debrief an offboard pilot about prior pilot voice communications during a flight;
enable a dynamic priority filter to identify relevant voice communications recorded by a playback system in conversations between air traffic control (ATC) and a pilot to debrief the offboard pilot by:
transcribe the conversations recorded by the playback system to process by the dynamic priority filter;
identify, by the dynamic priority filter, text content transcribed in the conversations using a speech engine for analysis of the text content for filtering into a set of multiple levels wherein each level contains a set of text messages;
tag at least one text message associated with context with a contextual tag to identify a category of in-flight events with the at least one text message;
assign a priority to the at least one tagged text message to generate at least one set of priority tagged messages;
enable the offboard pilot to select based on a category and priority at least one set of the priority tagged messages; and
display the selected set of priority tagged messages wherein the selected set of priority tagged messages are displayed in a chronological listing for associating a flight event.

18. The aircraft system of claim 17, further comprising:
the debriefing system configured to:
display the set of messages in accordance with the priority level to enable a priority order review from high to low priority.

19. The aircraft system of claim 17, further comprising:
the debriefing system configured to:
enable a display zoom feature that corresponds to low to high priority levels for displaying a set of text messages in accordance with a text message set associated priority level.

20. The aircraft system of claim 17, further comprising:
the debriefing system configured to:
display a set of text messages, within a cockpit instrument display in chronological order and in different colors for enabling a visual color-based priority order review and for enabling simultaneous viewing of the cockpit instrument display to maintain pilot situational awareness while reviewing multiple sets of text messages prioritized by color.

* * * * *